United States Patent [19]
Arkens et al.

[11] Patent Number: 5,143,582
[45] Date of Patent: Sep. 1, 1992

[54] HEAT-RESISTANT NONWOVEN FABRICS

[75] Inventors: Charles T. Arkens, Hatfield, Pa.; Charles E. Cluthe, Regency Park, Singapore; Reginald T. Smart, Horsham, Pa.

[73] Assignee: Rohm and Haas Company, Philadelphia, Pa.

[21] Appl. No.: 696,417

[22] Filed: May 6, 1991

[51] Int. Cl.$^5$ ............................................. D21H 11/00
[52] U.S. Cl. ..................................... 162/135; 162/156; 162/164.6; 162/164.7; 428/285; 524/494; 524/538; 525/329.9; 528/302
[58] Field of Search .......... 162/135, 156, 164.6–164.7; 428/285; 524/494, 538; 525/329.9; 528/302

[56] References Cited

U.S. PATENT DOCUMENTS

| | | | |
|---|---|---|---|
| 3,867,348 | 2/1975 | Hirschmann | 8/116.3 X |
| 4,076,917 | 2/1978 | Switt et al. | 526/49 |
| 4,,455,342 | 6/1984 | Fink et al. | 428/265 |
| 4,609,431 | 9/1986 | Grose et al. | 162/164.6 X |
| 4,925,528 | 5/1990 | Tse et al. | 162/164.6 X |
| 4,999,239 | 3/1991 | Iacoviello et al. | 428/288 |

Primary Examiner—Michael Lusignan

[57] ABSTRACT

A method for making a heat resistant nonwoven fabric is provided. A formaldehyde-free binder composition containing a carboxy group, or a carboxylic anhydride, or salts of a carboxy group; and a β-hydroxyalkyl amide contacts a nonwoven fabric containing heat-resistant fibers, and heating the binder composition is effected.

12 Claims, No Drawings

HEAT-RESISTANT NONWOVEN FABRICS

FIELD OF THE INVENTION

This invention relates to a method for making a nonwoven fabric for use in applications where high temperatures are encountered. The nonwovens contain heat-resistant fibers and a formaldehyde-free binder composition which assists in consolidating the fibers into a strong, heat-resistant substrate.

BACKGROUND OF THE INVENTION

Nonwoven fabrics are composed of fibers which may be consolidated by purely mechanical means such as, for example, entanglement caused by needle-punching, by chemical means such as, for example, saturation with a polymeric binder, or by combinations thereof. Some nonwoven fabrics are used at temperatures substantially higher than ambient temperature such as, for example, glass fiber-containing nonwoven fabrics which are impregnated with a hot asphaltic composition pursuant to making roofing shingles or roll roofing material. When a nonwoven fabric is contacted with a hot asphaltic composition at temperatures of 150°–250° C., the nonwoven fabric may sag, shrink, or otherwise become distorted. Therefore, nonwoven fabrics which incorporate a polymeric binder should substantially retain the properties contributed by the polymeric binder such as, for example, strength. In addition, the binder should not substantially detract from essential nonwoven fabric characteristics, as would be the case, for example, if the polymeric binder were too rigid or brittle or became sticky under processing conditions.

There is a need for a method for making a heat-resistant nonwoven fabric by using heat-resistant fibers and a heat-resistant nonwoven polymeric binder composition which is free of potentially polluting solvents and is also free from formaldehyde.

DESCRIPTION OF THE PRIOR ART

U.S. Pat. No. 3,867,348 discloses a copolymer crosslinking agent which contains at least one unsaturated N-substituted amide of $\alpha,\beta$-unsaturated carboxylic acid which cannot be methylolated, the substituent of which is an aliphatic moiety containing a diol-1,2 or -1,3 group corresponding to a specific formula such as, for example, N-dihydroxy-2,3-propyl methacrylamide, and at least one nitrogen methylolated compound selected from the group comprising urea, its substituted derivatives, and cyclic ureas. Also disclosed is the use of the crosslinking agent in bonding nonwoven fabrics having good resistance to organic solvents and to improve abrasion and crease resistance. U.S. Pat. No. 3,867,348 does not disclose a method for making a heat-resistant nonwoven wherein a binder composition containing a carboxy group, or a carboxylic anhydride, or salts of a carboxy group; and a $\beta$-hydroxyalkyl amide contacts a nonwoven fabric containing heat-resistant fibers, and the binder composition is cured.

U.S. Pat. Nos. 4,076,917 discloses a method for curing or crosslinking polymers having carboxy or anhydride groups by treating the polymers with either a $\beta$-hydroxyalkylamide or a polymer prepared from a b-hydroxyalkylamide. Also disclosed are self-curing polymers containing both carboxy and $\beta$-hydroxyalkylamide functionality. It is further disclosed that polymers containing the $\beta$-hydroxyalkylamide functionality can be used in forming films, fibers, paints, lacquers, varnishes, seamless flooring, caulks or impregnants as adhesives for both natural and synthetic materials, such as paper, textiles, wood, plastics, metal and leather; as binders for non-woven fabrics, in the preparation of inks and in all areas where epoxy and melamine finishes are presently prepared. U.S. Pat. No. 4,076,917 does not disclose a method for making a heat-resistant nonwoven wherein a binder composition containing a carboxy group, or a carboxylic anhydride, or salts of a carboxy group; and a $\beta$-hydroxyalkyl amide contacts a nonwoven fabric containing heat-resistant fibers, and the binder composition is cured.

U.S. Pat. No. 4,455,342 discloses aqueous dispersions of an acrylic resin which is suitable for the reinforcement of fibrous articles and is free of formaldehyde and acrylonitrile, which resin contains (a) from 70 to 96.95 weight percent of alkyl esters of acrylic acid and/or methacrylic acid, or mixtures of such esters with styrene; (b) from 2 to 30 weight percent of a hydroxyalkyl ester of an unsaturated carboxylic acid; (c) from 1 to 10 weight percent of acrylamide or of methacrylamide; (d) from 0.05 to 3 weight percent of a crosslinking comonomer having at least two polymerizable double bonds; (e) up to 5 weight percent of a unsaturated carboxylic acid; (f) up to 20 weight percent of one or more further monomers, as well as fibrous articles reinforced with such a resin dispersion and showing reduced loss of resin binder on drycleaning and reduced absorption of plasticizers, and methods of making such articles. U.S. Pat. No. 4,455,342 does not disclose a method for making a heat-resistant nonwoven wherein a binder composition containing a carboxy group, or a carboxylic anhydride, or salts of a carboxy group; and a $\beta$-hydroxyalkyl amide contacts a nonwoven fabric containing heat-resistant fibers, and the binder composition is cured.

U.S. Pat. No. 4,999,239 discloses a nonwoven product exhibiting resistance to degradation caused by hot oil, in which a nonwoven web of fibers is bonded together with a copolymer deposited from an emulsion having 20–70% solids of a copolymer consisting essentially of 65–90 wt. % vinyl chloride, 5–35 wt. % ethylene, and up to 10 wt. % of a hydroxyalkyl- or carboxylic acid-containing functional comonomer, the copolymer being prepared in the presence of a stabilizing system consisting essentially of 3–15 wt. % polyvinyl alcohol which is 70–91 mole % hydrolyzed. U.S. Pat. No. 4,999,239 does not disclose a method for making a heat-resistant nonwoven wherein a binder composition containing a carboxy group, or a carboxylic anhydride, or salts of a carboxy group; and a $\beta$-hydroxyalkyl amide contacts a nonwoven fabric containing heat-resistant fibers, and the binder composition is cured.

None of the references teach a method for making a heat-resistant nonwoven fabric wherein a binder composition containing a carboxy group, or a carboxylic anhydride, or salts of a carboxy group; and a $\beta$-hydroxyalkyl amide contacts a nonwoven fabric containing heat-resistant fibers, and heating the binder composition.

It is, therefore, an object of this invention to provide a method for making a heat-resistant nonwoven fabric.

It is also an object of this invention to provide a method for making a heat-resistant nonwoven fabric without the use of potentially polluting solvents and by using a binder composition which is free from formaldehyde.

SUMMARY OF THE INVENTION

A method for making a heat-resistant nonwoven fabric is provided. A formaldehyde-free binder composition containing a carboxy group, or a carboxylic anhydride, or salts of a carboxy group; and a β-hydroxyalkyl amide contacts a nonwoven fabric containing heat-resistant fibers, and heating the binder composition is effected.

DETAILED DESCRIPTION OF THE INVENTION

This invention relates to a method for making a heat-resistant nonwoven fabric.

A formaldehyde-free binder composition is formed from polymers having carboxy- or anhydride- or carboxy salt-groups by admixing the polymers with either a β-hydroxyalkylamide or a polymer prepared from a β-hydroxyalkylamide. This invention also embraces self-curing polymers containing both carboxy and b-hydroxyalkylamide functionality.

All carboxy- and anhydride- and carboxy salt-containing polymers may be used in the practice of this invention. Such polymers may be prepared by any method known in the art such as, for example, solution polymerization, aqueous suspension polymerization, and aqueous emulsion polymerization. The polymers may contain up to 100%, by weight based on the weight of the polymer, of carboxy-, anhydride-, or carboxy salt-containing monomers, or mixtures thereof. Addition polymers containing up to 100%, by weight based on the weight of the polymer, of polymerized ethylenically unsaturated monomers bearing carboxy groups, carboxylic anhydride groups, or salts of carboxy groups, or mixtures thereof, may be used. Addition polymers containing from about 20% up to 100%, by weight based on the weight of the polymer, of polymerized ethylenically unsaturated monomers bearing carboxy groups, carboxylic anhydride groups, or salts of carboxy groups, or mixtures thereof, are preferred in order to achieve a desirable degree of reaction with the β-hydroxyalkylamides.

Examples of preferred monomers which may be incorporated into the polymer backbone and reacted with the β-hydroxyalkylamides (See Formula I, below) include unsaturated monocarboxylic acids such as, for example, acrylic acid, methacrylic acid, crotonic acid and the like, unsaturated dicarboxylic acids, such as maleic acid, 2-methyl maleic acid, fumaric acid, itaconic acid, 2-methyl itaconic acid, α,β-methyleneglutaric acid, and the like; salts of unsaturated monocarboxylic or unsaturated dicarboxylic acids; and unsaturated anhydrides, such as, for example, maleic anhydride, itaconic anhydride, acrylic anhydride, methacrylic anhydride, and the like. When it is desirable to use polymers containing carboxy salt groups, these groups may be incorporated into the polymer directly or a carboxy group-containing polymer may be neutralized, all or in part, with a base such as, for example, ammonia, sodium hydroxide, or an amine. It is preferred to neutralize the carboxy groups with a volatile amine in order to avoid the water sensitivity inherent in carboxy salt groups should they remain unreacted. It is preferred to use ammonia, neutralizing to a pH of about 7.5. When a carboxy-containing polymer prepared by emulsion polymerization is used, it may be desirable to neutralize the polymer to at least the extent that it becomes water-soluble.

The β-hydroxyalkylamides employed in this invention are efficient curing agents for carboxy-containing and anhydride-containing polymers and can be employed without any catalyst required. In addition, the b-hydroxyalkylamides are soluble in a wide range of solvents including water. This water solubility is especially desirable because it eliminates the necessity of employing substantially any organic solvents. Further, the binder composition employed in this invention is free from formaldehyde nor does it release or generate formaldehyde during the contacting or heating steps of this method.

In the method of this invention, in order to form a binder composition, polymers having carboxy- or anhydride- or carboxy salt- groups are admixed with either a β-hydroxyalkylamide of the formula:

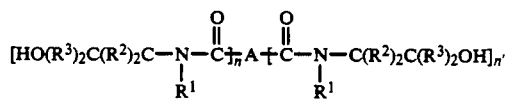

$$[HO(R^3)_2C(R^2)_2C-N-C]_n A + C-N-C(R^2)_2C(R^3)_2OH]_{n'}$$
$$\quad\quad\quad\quad\quad\quad | \quad\quad\quad\quad | $$
$$\quad\quad\quad\quad\quad\quad R^1 \quad\quad\quad\quad R^1$$

I wherein A is a bond, hydrogen or a monovalent or polyvalent organic radical derived from a saturated or unsaturated alkyl radical wherein the alkyl radical contains from 1-60 carbon atoms, such as methyl, ethyl, propyl, butyl, pentyl, hexyl, heptyl, octyl, nonyl, decyl, eicosyl, triacontyl, tetracontyl, pentacontyl, hexylcontyl and the like; aryl, for example, mono- and dinuclear aryl such as phenyl, naphthyl and the like; tri-lower alkyleneamino such as trimethyleneamino, triethyleneamino and the like; or an unsaturated radical containing one or more ethylenic groups [>C=C<]- such as ethenyl, 1-methylethenyl, 3-butenyl-1,3-diyl, 2-propenyl-1,2-diyl, carboxy lower alkenyl, such as 3-carboxy-2-propenyl and the like, lower alkoxy carbonyl lower alkenyl such as 3-methoxycarbonyl-2-propenyl and the like; $R^1$ is hydrogen, lower alkyl of from 1-5 carbon atoms such as methyl, ethyl, n-propyl, n-butyl, sec-butyl, tert-butyl, pentyl and the like or hydroxy lower alkyl of from 1-5 carbon atoms such as hydroxyethyl, 3-hydroxypropyl, 2-hydroxypropyl, 4-hydroxybutyl, 3-hydroxybutyl, 2-hydroxy-2-methylpropyl, 5-hydroxypentyl, 4-hydroxypentyl, 3-hydroxypentyl, 2-hydroxypentyl and the isomers of pentyl; $R^2$ and $R^3$ are the same or different radicals selected from hydrogen, straight or branched chain lower alkyl of from 1-5 carbon atoms or one of the $R^2$ and one of the $R^3$ radicals may be joined to form, together with the carbon atoms, such as cyclopentenyl, cyclohexyl and the like; n is an integer having a value of 1 or 2 and n' is an integer having a value of 0 to 2 or when n' is 0, a polymer or copolymer (i.e., n has a value greater than 1, preferably 2-10) formed from the β-hydroxyalkylamide when A is an unsaturated radical.

Preferred compounds for admixing with the carboxy- or anhydride- or carboxy salt-containing polymers are those of the foregoing Formula I, wherein $R^1$ is H, lower alkyl, or $HO(R^3)_2C(R^2)_2C-$, n and n' are each 1, $-A-$ is $-(CH_2)_m-$, m is 0-8, preferably 2-8, each $R^2$ is H, and one of the $R^3$ radicals in each case is H and the other is H or a $C_1-C_5$ alkyl; that is,

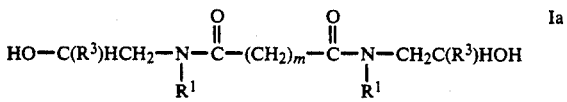

wherein $R^1$, $R^3$, and m have the meanings just given. Examples of the most preferred compounds fall within the formula:

wherein $R^3$ is limited to H in both cases or —$CH_3$ in both cases.

Specific examples falling within Formula Ib are bis[N,N-di(b-hydroxyethyl)]adipamide, bis[N,N-di(b-hydroxypropyl)]azelamide, bis[N-N-di(b-hydroxypropyl)]adipamide, and bis[N-methyl-N-(b-hydroxyethyl)]oxamide. These latter compounds are preferred because of their excellent water solubility and their fast reactivity with carboxy and anhydride groups. In addition, the precursors are readily available.

Preferred among compounds of Formula Ib are those compounds wherein $R^1$ is methyl or hydroxyethyl and m is an integer of 2 to 8.

The β-hydroxyalkylamides may be prepared according to the teachings of U.S. Pat. No. 4,076,917, hereby incorporated herein by reference.

To form the binder composition, the β-hydroxyalkylamide (I) or polymer thereof is admixed with the carboxy- or anhydride- or carboxy salt-containing polymer at a ratio in the range of from about 0.5 to about 2 parts of hydroxy functions per one part of carboxy or anhydride or carboxy salt function. A 1:1 ratio of carboxy to hydroxy and a 0.5:1 ratio of anhydride to hydroxy function is preferred for some applications. A 0.7:1 ratio of hydroxy function to carboxy function is preferred when the carboxy function os present in the form of poly(acrylic acid). Ratios outside of the above ranges may be employed but curing efficiency is reduced. For use with solution polymers, the β-hydroxyalkylamide (I) or polymer thereof is dissolved directly into the polymer solution with or without a solvent. Solvents which may be employed include aromatics, such as toluene, xylene and the like; aliphatics such as heptane, octane and the like; water, dimethylformamide, dimethylsulfoxide, also halogenated solvents, ethers, esters and alcohols, depending on the solubility of particular crosslinkers.

The β-hydroxyamides (I) are especially useful because they can be employed without any solvent or in aqueous solution to afford non-polluting coatings. The aqueous solutions are prepared from the salts of the carboxy polymers, for example, amine salts such as dimethylaminoethanol, trimethylamine, triethylamine, diethanolamine, methylethanolamine, or ammonium salts, and the like.

It should be apparent from this disclosure that when copolymers containing β-hydroxyalkylamides (I, supra) are prepared with carboxy containing monomers, self-curing polymer will be obtained and when prepared without any carboxy or anhydride containing monomers, curing of the copolymer may be effected by treating said copolymers with acids or anhydrides such as those saturated acids mentioned above in the preparation of the esters of Formula II and saturated anhydrides such as succinic, glutaric, phthalic, tetrahydrophthalic, 1,2,4,5-benzene-tetracarboxylic and the like.

In addition, the binder composition may advantageously contain at least one divalent ion such as, for example, zinc, zirconium, nickel, cobalt, and the like, in an amount sufficient to effect an increase in the dry tensile strength of the treated nonwoven. The use of zinc at a level of about 0.01 to about 1.0 equivalents of zinc per equivalent of carboxy-containing group is preferred.

In addition, conventional treatment components such as, for example, emulsifiers, pigments, fillers, anti-migration aids, curing agents, thickeners, flame retardants, coalescents, wetting agents, biocides, plasticizers, anti-foaming agents, colorants, waxes, and anti-oxidants, may be used in the binder composition.

The binder composition is applied to a nonwoven fabric which contains heat-resistant fibers such as, for example, aramid fibers, polyester fibers, and glass fibers. By "heat-resistant fibers" herein is meant fibers which are substantially unaffected by exposure to temperatures above about 125° C. The binder composition may be applied to the nonwoven by conventional techniques such as, for example, air or airless spraying, padding, saturating, roll coating, curtain coating, or the like.

The binder composition containing the β-hydroxyalkylamide (I) is cured by heating at a temperature in the range of from about 125° C. to about 400° C. and preferably in the range of from about 125° C. to about 175° C. for a period of time in the range of from about 0.5 to about 30 minutes. It is not necessary to employ a catalyst to effect curing.

After curing the binder composition, the heat resistant-nonwoven fabric may be used in applications where properties of the binder composition-containing nonwoven fabric at high temperatures, such as temperatures above 125° C., are important such as, for example, in preparing roofing substrate wherein the nonwoven fabric is contacted with a hot asphaltic composition and in preparing cushioned flooring wherein the nonwoven fabric is contacted with a PVC plastisol composition which is subsequently fluxed and foamed at high temperatures. The heat-resistant nonwoven fabric may also be used in insulation and filter applications where high temperatures are encountered.

The following examples are intended to illustrate the method for making a heat-resistant nonwoven fabric, to which this invention is directed. They are not intended to limit the invention as other applications of the invention will be obvious to those of ordinary skill in the art.

EXAMPLE 1

Preparation of Binder Composition

To 100 grams of a solution of the ammonium salt of a polycarboxylic acid of $M_w=2500$ (determined by gel permeation chromatography) (as a 30%, by weight, solution in water) was added 50 grams of a solution of bis[N,N-di(b-hydroxyethyl)]adipamide (as a 50% by weight solution in water), with stirring, at 25° C.

EXAMPLE 2

Preparation of Glass Fiber Handsheets and Saturation of Sheets with Binder Composition A 110 gallon tank equipped with an air-driven mixer was filled with deionized water which was then adjusted to pH=9.0 with ammonium hydroxide. 14 ppm.

(based on the weight of the water) of a polyoxyethylated alkyl amine (KATAPOL VP-532) and 31 ppm. (based on the weight of the water) of a polyacrylamide thickener (SEPARAN AP-273) were added. The mixture was stirred for 15 minutes and then allowed to sit for 15 minutes. Five gallons of the prepared solution ("white water") was pumped into a 6 gallon stainless steel dispersion tank equipped with an air-driven mixer; The tank had four vertical baffles to give more thorough mixing. The stirrer was turned on and 6.2 g. of 1¼" long glass fiber (OCF-687) was added and then mixed for three minutes. Polyester scrim was placed on the bottom of a 12 inch by 12 inch square Williams sheet mold. The mold was closed and half-filled with water. The stirrer in the dispersion tank was turned off. After 30 seconds the valve on the dispersion tank was opened to drain the dispersed glass into the sheet mold. Simultaneously the drain valve on the sheet mold was opened. When the slurry had drained from the dispersion tank, absorbant paper was inserted into the nozzle to prevent any drips from marring the sheet before the sheet mold was fully drained. The sheet mold was opened and the scrim with the formed glass fiber sheet was lifted off and transferred to a screen stand. The excess water was vacuumed off with a large "shop vac" which was fitted with a 14 inch head. The binder composition was applied with a perforated funnel, maintaining a gentle flow so that the fibers were not disturbed. Excess binder composition was vacuumed off. After one stroke was made the glass fiber sheet was turned 90 degrees and another stroke performed. The treated glass fiber sheet was then transferred to another piece of scrim to prevent sticking to the first scrim and dried and cured for 3 minutes at 204 C. in a high volume Werner-Mathis oven which causes air to impinge the sheet from the top and bottom. The target LOI (loss on ignition) was 22% and 1.7 lbs./100 sq. ft. basis weight.

EXAMPLES 3-7

Preparation of Binder Compositions with Various Carboxy Group-Containing Ingredients of Various Molecular Weights Binder compositions were made according to the process of Example 1 with the exception that the carboxy group-containing ingredients were those given in Table 3.1. The amount of carboxy-group containing ingredient was chosen to provide 1 equivalent of carboxy group per equivalent of bis[N,N-di(b-hydroxyethyl)]adipamide.

TABLE 3.1

| Carboxy Group-Containing Ingredients Used in Examples 3-6. | | |
|---|---|---|
| Example No. | Carboxy Group-Containing Ingredients | $M_w$ |
| 3 | poly(acrylic acid) | 19,000 |
| 4 | poly(acrylic acid/ethyl acrylate)30/70 | 19,000 |
| 5 | poly(acrylic acid) | 60,000 |
| 6 | poly(ethyl acrylate/methyl methacrylate/methacrylic acid)(50/42/8) | 40,000 |
| 7 | citric acid | |

EXAMPLE 8

Testing of Binder Composition-Treated Handsheets

Tensile strength samples which were 1×4 inches were die-cut from binder composition-treated handsheets and were run on an INTELECT tensile tester at 2 inches/minute with a 2-inch gap for dry and wet(after a 10 minute soak in 180° F. water). Hot tensiles were run after equilibrating for 1.5 minutes at 400° F. A minimum of four test specimens were run for each tensile strength and the mean was reported. The hot tensile strength is designed to simulate conditions to which a nonwoven substrate would be subjected during treatment such as, for example, with a hot asphaltic composition as in the manufacture of a roofing substrate.

Elmendorf Tear strength samples which were 1×4 inches were die-cut from binder composition-treated handsheets and were run according to ASTM Test Method D 1922-78. Elemendorf tear strength designated herein as "ET" was reported in grams.

MIT Folding Endurance was run according to TAPPI Test Method T-511. MIT Folding Endurance designated herein as "MIT" was reported as number of double folds.

TABLE 8.1

| | Testing of binder composition-treated handsheets. | | | | | | | | |
|---|---|---|---|---|---|---|---|---|---|
| | | | Tensile Strength(lb./in.) | | | | | | |
| Binder Comp. | LOI | BW | Dry | % E | Wet | % E | Hot T | ET | MIT |
| Example 1 | 28.1 | 1.8 | 37.9 | 2.9 | 11.9 | 1.6 | — | 334 | — |
| Example 3 | 28.9 | 2.0 | 36.8 | 2.9 | 23.1 | 2.2 | — | 228 | — |
| Example 4 | 29.8 | 1.8 | 36.9 | 3.1 | 22.9 | 2.3 | — | 256 | — |
| Example 5 | 21.7 | 1.9 | 39.8 | 2.1 | 28.9 | 1.4 | 30.0 | 281 | 6.4 |
| Example 6 | 18.4 | 1.7 | 28.0 | 1.9 | 17.2 | 2.0 | 7 | 716 | 24 |
| Example 7 | 22.8 | 1.8 | 31.9 | 2.7 | 14.7 | 1.9 | 17 | 134 | 2 |

LOI = % weight loss in ignition
BW = basis weight in pounds per 100 square feet
% E = % elongation
Hot T = hot tensile strength in pounds per inch, at 400 F.

The binder compositions used in the method of this invention all yield nonwovens which may be used for heat-resistant applications.

EXAMPLE 9

Binder Compositions with Various Ratios of Carboxy Group-Containing ingredient to B-Hydroxyalkylamide The binder composition of Example 5 was prepared with the exception that the ratio of the equivalents of carboxy group-containing ingredient to the equivalents of bis[N,N-di(b-hydroxyethyl)]adipamide was varied as is presented in Table 9.1. Glass fiber nonwoven handsheets were prepared and tested according to Examples 2 and 8; results are presented in Table 9.1.

TABLE 9.1

Testing of binder composition-treated handsheets.

| Acid/Amide | LOI | BW | Dry | % E | Wet | % E | Hot T | ET | MIT |
|---|---|---|---|---|---|---|---|---|---|
| 1/1(eq.) | 25.0 | 1.8 | 42.3 | 2.0 | 24.1 | 1.5 | 27 | 336 | 7 |
| 1/0.8(eq.) | 25.0 | 1.8 | 39.9 | 2.0 | 27.1 | 1.5 | 33 | 343 | 6 |
| 1/0.71(eq.) | 23.0 | 1.9 | 37.6 | 2.1 | 25.8 | 1.5 | 34 | 285 | 4.1 |
| 1/0.6(eq.) | 22.7 | 1.7 | 39.5 | 2.1 | 25.8 | 1.5 | 35 | 354 | 7 |
| 1/0.4(eq.) | 23.6 | 1.8 | 37.2 | 3.3 | 18.3 | 1.8 | 35 | 217 | 3 |
| 1/0.2(eq.) | 21.4 | 1.8 | 34.6 | 3.0 | 6.2 | 1.4 | 28 | 218 | 4 |
| 1/0 (eq.) (Comparative) | 19.6 | 1.7 | 20.0 | 1.6 | too weak | | 16 | 414 | 4 |

The binder compositions used in the method of this invention all yield nonwovens which may be used for heat resistant applications.

EXAMPLE 10

Binder Compositions Incorporating Multivalent Ions

Binder compositions of this invention were modified by the incorporation of zinc ammonium carbonate (as ZINPLEX 15, a formulated commercial zinc ammonium carbonate); the level of Zn was calculated in terms of the equivalents of Zn metal based on the equivalents of carboxylic acid present as presented in Table 10.1. Glass fiber nonwoven handsheets were prepared and tested according to Examples 2 and 8; results are presented in Table 10.1.

TABLE 10.1

Testing of binder composition-treated handsheets.

| Binder Comp. | LOI | BW | Dry | % E | Wet | % E | Hot T | ET | MIT |
|---|---|---|---|---|---|---|---|---|---|
| Ex. 5/No Zn | 21.7 | 1.9 | 39.8 | 2.1 | 28.9 | 1.4 | 30.0 | 281 | 6.4 |
| Ex. 5/Zn (0.05 eq.) | 20.9 | 1.8 | 46.8 | 2.4 | 26.7 | 1.5 | 25.0 | 269 | 5.1 |
| Ex. 5/No Zn | 25.0 | 1.8 | 42.2 | 2.0 | 24.1 | 1.5 | 27 | 336 | 7 |
| Ex. 5/Zn (0.1 eq.) | 19.3 | 1.8 | 43.6 | 2.2 | 22.4 | 1.4 | 28 | 368 | 6 |
| Ex. 5/Zn (0.5 eq.) | 22.3 | 1.7 | 46.0 | 2.3 | 20.2 | 1.4 | 25 | 296 | 7 |

The incorporation of zinc into the binder composition used in the method of this invention leads to a small increase in the dry tensile strength and elongation but does not increase the hot tensile strength.

What is claimed is:

1. A method for making a heat-resistant nonwoven fabric comprising:

(a) forming a binder composition comprising a polymer, said polymer containing carboxy groups or carboxylic anhydride groups or salts of said carboxy groups, and a $\beta$-hydroxyalkyl amide of the formula:

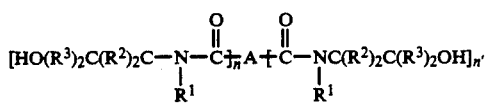

wherein A is a bond, hydrogen or a monovalent or polyvalent organic radical derived from a saturated or unsaturated alkyl radical wherein the alkyl radical contains from 1–60 carbon atoms; aryl; tri-lower alkyleneamino; or an unsaturated radical containing at least one ethylenic group $[>C=C<]$; $R^1$ is hydrogen, lower alkyl having 1–5 carbon atoms, or hydroxyalkyl having from 1–5 carbon atoms, $R^2$ and $R^3$ are the same or different, being hydrogen, straight or branched chain lower alkyl having 1–5 carbon atoms or one of the $R^2$ and one of the $R^3$ radicals may be joined to form, together with the carbon atoms to which they are attached, cycloalkyl; n is an integer having a value of 1 or 2 and n' is an integer having a value of 0 to 2 or when n' is 0, a polymer or copolymer (i.e., n has a value greater than 1 preferably 2–10) formed from the $\beta$-hydroxyalkylamide when A is an unsaturated radical;

(b) contacting a nonwoven comprising heat-resistant fibers with said binder composition; and (c) heating said binder composition at a temperature of from about 125° C. to about 400° C. until a cured polymer is obtained.

2. The method of claim 1 wherein said b-hydroxyalkyl amide has the formula:

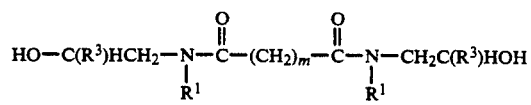

wherein m is 0–8; $R^1$ is hydrogen, lower alkyl having 1 to 5 carbon atoms, or hydroxyalkyl having from 1 to 5 carbon atoms; and $R^3$ is selected from hydrogen and straight or branched chain lower alkyl having from 1 to 5 carbon atoms.

3. The method of claim 2 wherein $R^1$ is hydroxyalkyl and said b-hydroxyalkyl amide has the formula

wherein $R^3$ is —H or —CH$_3$.

4. The method of claim 1 wherein said carboxy groups or carboxylic anhydride groups or salts of said carboxy groups are present in an addition polymer of ethylenically unsaturated monomers.

5. The method of claim 4 wherein said addition polymer contains at least one ethylenically unsaturated monomer selected from the group consisting of acrylic acid, methacrylic acid, crotonic acid, fumaric acid, maleic acid, 2-methyl maleic acid, itaconic acid, 2-methyl itaconic acid, α,β-methyleneglutaric acid, maleic anhydride, itaconic anhydride, acrylic anhydride, and methacrylic anhydride.

6. The method of claim 4 wherein said addition polymer contains at least one ethylenically unsaturated monomer selected from the group consisting of acrylic acid and methacrylic acid.

7. The method of claim 1 wherein said binder composition further comprises a divalent metal.

8. The method of claim 7 wherein said divalent metal is Zinc and wherein said Zinc is used at a level of from about 0.02 to about 1.0 equivalents of Zinc to 1.0 equivalent of carboxy groups.

9. The method of claim 1 wherein said heat resistant fibers are glass fibers.

10. A heat-resistant nonwoven product prepared according to the method of claim 1.

11. An asphaltic roofing substrate comprising the heat-resistant nonwoven product of claim 10.

12. A cushioned flooring product comprising the heat-resistant nonwoven product of claim 10.

* * * * *